United States Patent

Hinz, Jr.

[15] 3,639,900

[45] Feb. 1, 1972

[54] ENHANCED ERROR DETECTION AND CORRECTION FOR DATA SYSTEMS

[72] Inventor: Harry Carl Hinz, Jr., Arvada, Colo.

[73] Assignee: International Business Machines Corporation, Armonk, N.Y.

[22] Filed: May 27, 1970

[21] Appl. No.: 40,836

[52] U.S. Cl. .................................... 340/146.1, 340/174.1 B
[51] Int. Cl. .................................... G06k 5/00, G11b 27/36
[58] Field of Search ................ 340/174 ED, 146.1 R, 174.1 B

[56] References Cited

UNITED STATES PATENTS 3,551,886 12/1970 Cook .............................. 340/174.1 X
3,248,695 4/1966 Dascotte ............................ 340/146.1

*Primary Examiner*—Eugene G. Botz
*Assistant Examiner*—R. Stephen Dildine, Jr.
*Attorney*—Hanifin and Jancin and Herbert F. Somermeyer

[57] ABSTRACT

Quality of record readback operations on a real time basis is used as pointers to possible error conditions. The pointers are combined with error detecting and correcting coding schemes, preferably of the residue type, for detecting and correcting large numbers of errors in a group of data bits. The data and check bits are preferably organized in a geometric array in a self-clocking record system of the magnetic media type, the data within check bits are uncoded run-length-limited code. During readback, the run-length-limited code is first converted to data and check bits, then error detection and correction is effected using the pointers. Validity of the run-length-limited code is used as an additional pointer. Examples of marginal operation pointers are excessive phase shift in the readback signal, undesired amplitude deviations in the readback signal, undesired velocity variations in the record system and incorrect wavelengths.

16 Claims, 9 Drawing Figures

FIG. 1
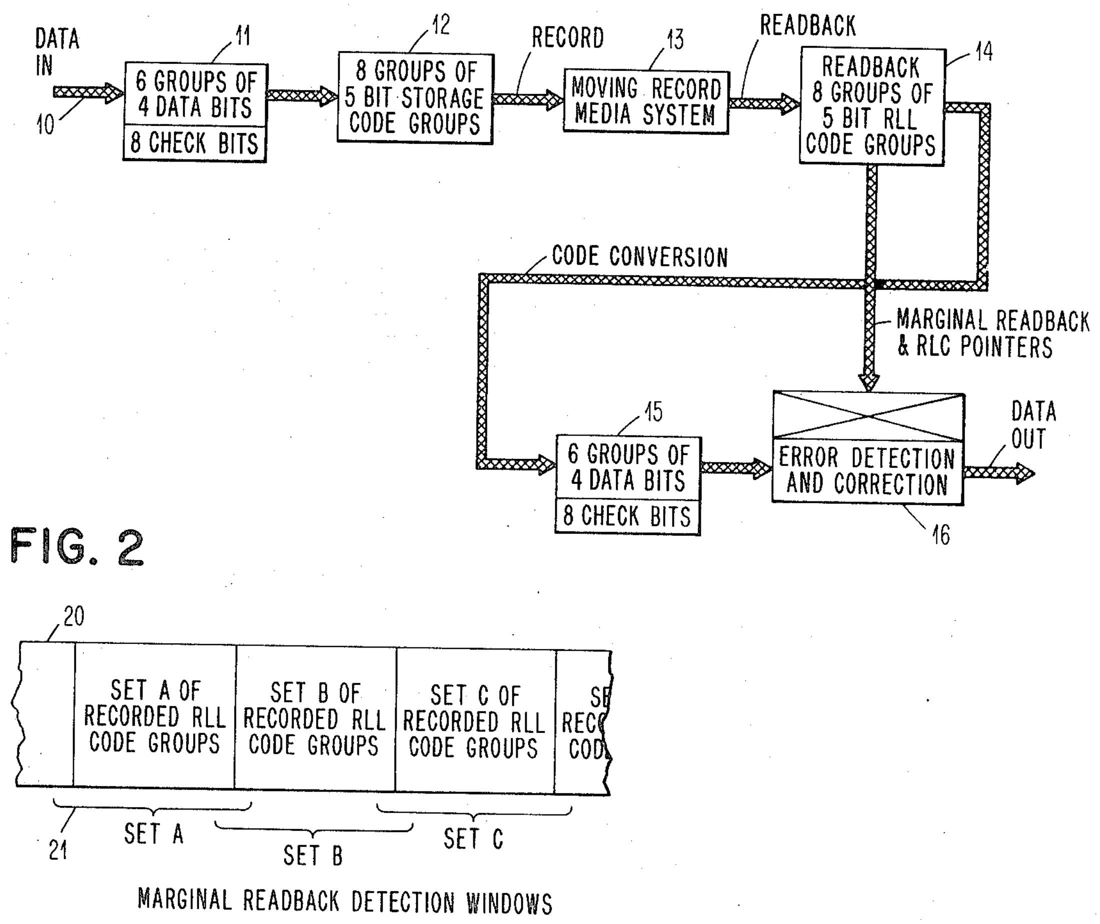
FIG. 2
FIG. 6
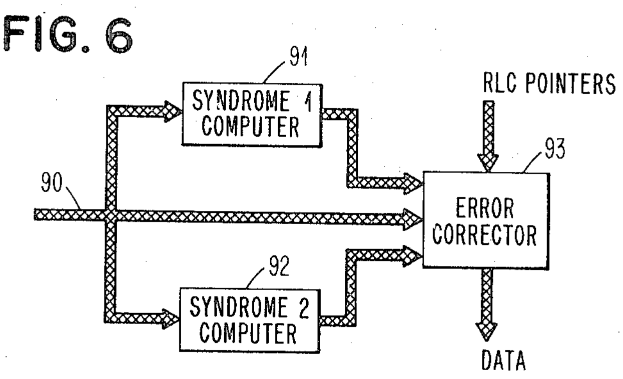
INVENTOR
HARRY C. HINZ, JR.
BY Herbert F. Somermeyer
ATTORNEY

CHECK BYTE GENERATION

| X01 | X02 | X03 | X04 | X11 | X12 | X13 | X14 | X21 | X22 | X23 | X24 | X31 | X32 | X33 | X34 | X41 | X42 | X43 | X44 | X51 | X52 | X53 | X54 | C11 | C12 | C13 | C14 | C21 | C22 | C23 | C24 |
|---|---|---|---|---|---|---|---|---|---|---|---|---|---|---|---|---|---|---|---|---|---|---|---|---|---|---|---|---|---|---|---|
| 1 | | | | 1 | | | | 1 | | | | 1 | | | | 1 | | | | 1 | | | | 1 | | | | | | | |
| | 1 | | | | 1 | | | | 1 | | | | 1 | | | | 1 | | | | 1 | | | | 1 | | | | | | |
| | | 1 | | | | 1 | | | | 1 | | | | 1 | | | | 1 | | | | 1 | | | | 1 | | | | | |
| | | | 1 | | | | 1 | | | | 1 | | | | 1 | | | | 1 | | | | 1 | | | | 1 | | | | |
| 1 | | | | | 1 | | | | | 1 | | 1 | | | 1 | 1 | 1 | | | | 1 | 1 | | | | | | 1 | | | |
| | 1 | | | | | 1 | | 1 | | | 1 | 1 | 1 | | | | 1 | 1 | | 1 | | 1 | 1 | | | | | | 1 | | |
| | | 1 | | 1 | | | 1 | 1 | 1 | | | | 1 | 1 | | 1 | | 1 | 1 | | 1 | | 1 | | | | | | | 1 | |
| | | | 1 | 1 | | | | | 1 | | | | | 1 | | 1 | | | 1 | 1 | 1 | | | | | | | | | | 1 |

ENHANCED ERROR DETECTION AND CORRECTION FOR DATA SYSTEMS

BACKGROUND OF THE INVENTION

The invention relates to record systems having error detecting and correcting codes integrally associated with recorded data signals.

To insure correctness of data signals recovered from a record system, such as a magnetic tape system, error detecting and correcting codes have long been used to indicate and correct errors inadvertently introduced into data signals for one reason or another. Generally, the greater the capability of the error detecting and correcting code, the greater the space on record media that is required and generally the greater the complexity of encoding and decoding mechanisms associated with the record system. In many instances, error detecting and correcting capabilities are limited by the space allocated to the residue check bits to be recorded with the data bits. As such, the optimum error detecting and correcting capability for dollars spent may not be obtained. Accordingly, it is desirable that error detection and correction capability of a given error detecting and correcting codes be enhanced without adding to the area on the record media required and without substantially adding to the complexity of the mechanism associated with the record system for detecting and correcting errors. That is, the error capability per dollar cost should be enhanced.

SUMMARY OF THE INVENTION

It is an object of the present invention to enhance error detection and correction capabilities for a record system for any given error detection/correction scheme.

During readback of signals from a record media, the quality of the readback signals for a given group of readback signals on a per track basis is evaluated. Upon detection of marginal characteristics, such as excessive phase shift, excessive amplitude deviations from a standard, excessive velocity deviations of the record media from a standard or incorrect received wavelengths, a marginal readback pointer for the track is generated for that group of data signals. Each group of data signals is associated with a separate and independent readback evaluation. During error detection and correction operations, the pointers are combined with the error detection and correction code to point to a group of signals as being in error. This action permits the error detection and correction code to be applied to tracks probably being in error to the exclusion of those tracks or groups of signals which apparently have a high-quality readback characteristic and probably not being in error. By so limiting the application of the error detection and correction codes, greater detection and correction capabilities are provided.

In one form of the invention, the record system utilizes a run-length-limited code for enhancing self-clocking characteristics and for reducing bandwidth of the record system. During readback, the five-bit code permutations are examined for verifying correctness of the readback of such run-length-limited codes. Upon detection of an illegal code combination, an RLC (run-length-limited code) pointer is generated and combined with the marginal readback pointers for being supplied to the error detection and correction for enhancing the operation as previously mentioned.

For insuring valid marginal readback pointers for each of the groups of data bits in an independent manner, a window is generated for examining the quality of the readback signal. Such windows preferably bracket each of the respective groups of signals in the respective tracks to generate a pointer which indicates a quality of the readback signals not only during readback of the individual groups, but also a predetermined time before and after the actual readback of such signals.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is an abbreviated data processing flow diagram of a preferred form of the present invention.

FIG. 2 is a simplified diagrammatic showing of a record media having signals recorded in accordance with the FIG. 1 illustrated flow chart.

FIG. 6 is a simplified diagram of error detection and correction circuits usable with the FIG. 3 illustrated system.

FIG. 8 is a simplified flow chart showing combining pointers and syndromes.

DETAILED DESCRIPTION

Figure 3:
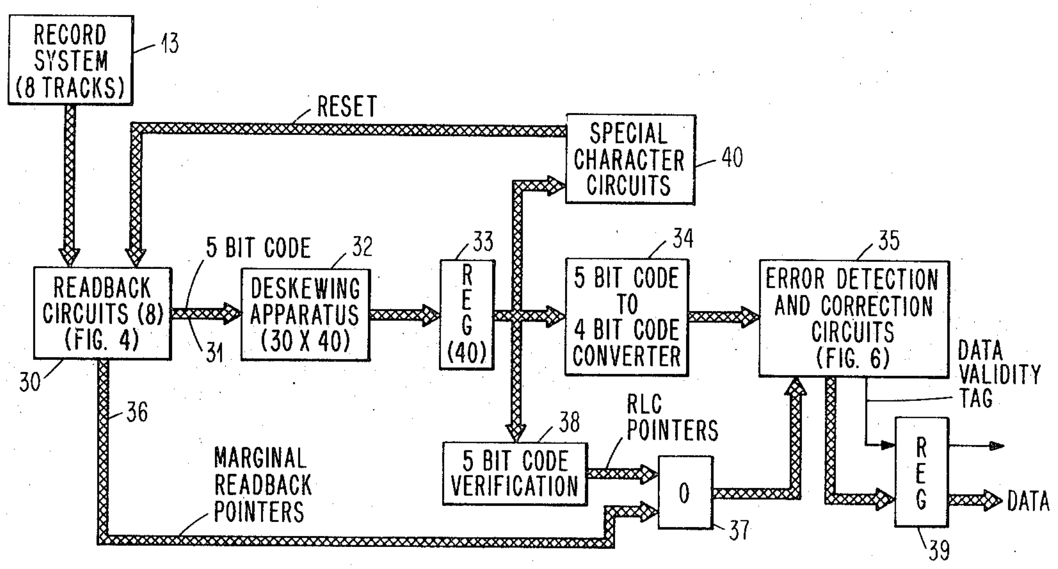
FIG. 3 is a simplified signal flow chart of a readback system illustrating the practice of the present invention.

With particular reference now to the appended drawing, like numerals and characters indicate like parts, structural features and functions in the various diagrams.

General Description

Referring now more particularly to FIG. 1, the general data processing operations used to illustrate the present invention are described. Data signals to be stored are received over cable 10 as six groups of four data bits each. In step 11, an error detection and correction code, having a residue of eight check bits, is generated based upon the permutations and arrangement of the data bits. In step 12, the six groups of four data bits each plus the two groups of four check bits each are converted into eight groups of five-bit storage codes. This storage code is preferably of the run-length-limit type for NRZI recording. That is, the run length of 0's is limited to two, for example. This selection limits the spacing between two successive flux changes on a record media. Such limit not only reduces the bandwidth by limiting the low-frequency components, but also enhances self-clocking, reduces peak shift and the like.

Table I below is a truth table showing the relationships between the four data or four check bits and the five-bit storage code. Additionally, a special character for "SPEC" is represented by all 1's in the storage code. It is understood that other special characters may be utilized.

TABLE I

| four-bit Data | five-bit Storage code |
|---|---|
| 0000 | 11001 |
| 0001 | 11011 |
| 0010 | 10010 |
| 0011 | 10011 |
| 0100 | 11101 |
| 0101 | 10101 |
| 0110 | 10110 |
| 0111 | 10111 |
| 1000 | 11010 |
| 1001 | 01001 |
| 1010 | 01010 |
| 1011 | 01011 |
| 1100 | 11110 |
| 1101 | 01101 |
| 1110 | 01110 |
| 1111 | 01111 |
| SPEC | 11111 |

After conversion of the five-bit storage codes, the eight groups of signals are recorded in moving record media system 13. It is preferred that each of the five-bit storage code groups be recorded in a single track along the moving media with the eight groups being recorded in eight parallel tracks. After being recorded on the media, the signals may be recovered in the known manner. Readback is by eight groups of five-bit storage code groups which are handled in the usual manner. During readback in step 14, the quality of the readback is monitored and if marginal, a pointer is applied to the error detection and correction operations performed in step 16. In step 15, the five-bit run-length code groups are converted to six groups of four data bits each and two groups of four check bits each. Then in step 16, the reconverted and detected data bits and check bits are combined in error detection decoding operations with the marginal readback pointers and any illegal code group pointers, to provide valid data to a data processing system (not shown). Steps 14, 15 and 16, with the marginal readback pointers and the illegal storage code pointers illustrate a prime feature of the present invention.

In FIG. 2, the data arrangement in idealized form is shown in three sets of recorded storage code groups. It is understood that tape 20, which may be a portion of a wider media, has at least eight tracks thereacross. Set A, therefore, consists of eight five-bit storage code groups. Downstream on the tape, sets B and C immediately adjacent to set A, each consists of a similar set of eight storage code groups. In detecting the quality of the readback, a window is generated in the readback circuits, or by microprogramming, to monitor the quality of the readback signal from the respective eight tracks for set A, as shown by bracket 21. The set A window starts slightly upstream from set A and extends thereacross into set B. For example, when a five-bit code group is used, each window may extend from the last digit position of the upstream code group through the first digit position of the downstream code group. Depending upon the dynamics of the system, the window may be further extended or contracted. Windows for sets B and C are the same as for set A. It is to be understood that the various sets of data may be interrelated for error detection purposes. For example, each set may be a subgroup in a field for error detection purposes. The pointers may be for each subgroup (set) or the field (several sets).

Readback and Pointer Generation

Referring now to FIG. 3, record system 13 with its eight tracks supplies eight independent readback signals to readback circuits 30. Such circuits recover data signals from the readback signals, recorded in NRZI, to supply five-bit code groups over cable 31 to deskewing apparatus 32. Since each of the tracks of record system 13 are preferably self-clocking, the five-bit code groups from the respective tracks are supplied independently and asynchronously. At higher recording densities, apparatus 32 must be able to store a plurality of five-bit code groups, such as six to eight code groups from each of the respective tracks. Apparatus 32 then supplies the deskewed five-bit code groups to register means 33, which is a buffer register for temporarily storing the deskewed sets of record signals. Register 33 can store one set of 40 signals. Converter 34 converts the five-bit codes from all eight tracks to four-bit codes. That is, it reconstructs the six groups of four data bits and two groups of four check bits, as in step 15. The reconverted data and check bit signals are supplied to error detection and correction circuits 35 in which errors are detected and corrected.

In accordance with the invention, the error detection and correction is enhanced by the generation of marginal readback pointers and RLC pointers. Readback circuits 30 generate, on a per-track basis, pointers indicating the quality of the readback. Such pointer signals for the respective groups of recorded signals are supplied over cable 36, through OR-function 37, to circuits 35. In a similar manner, the output of register 33 is supplied to five-bit code verification circuit 38 which detects illegal code permutations, that is, five-bit code groups that are not set forth in table I. This verification is performed on a per-track basis with the pointers being supplied and merged in OR-circuit 37 with the other pointers. The combined pointers are then used by the error detection and correction circuits 35 to provide valid data signals through buffer register 39 to a utilization means (not shown).

Register 33 also supplies the five-bit code group signals to special character circuits 40 which detect any special characters included in the record system. For example, see table I where all 1's are a special character. The use of special characters in record systems is well known. Such special character circuits may be connected to readback circuits 30 for resetting the circuits to a reference state such that synchronization of the five-bit code groups with respect to detection circuitry is established or reestablished. Not shown are the timing and the clocking systems necessary for successful operation of readback circuits. Since these are so well known and form no part of the present invention, they have been eliminated for purposes of simplicity. In the actual constructed embodiment of the present invention, such clocking circuits, of course, were used.

Figure 4:
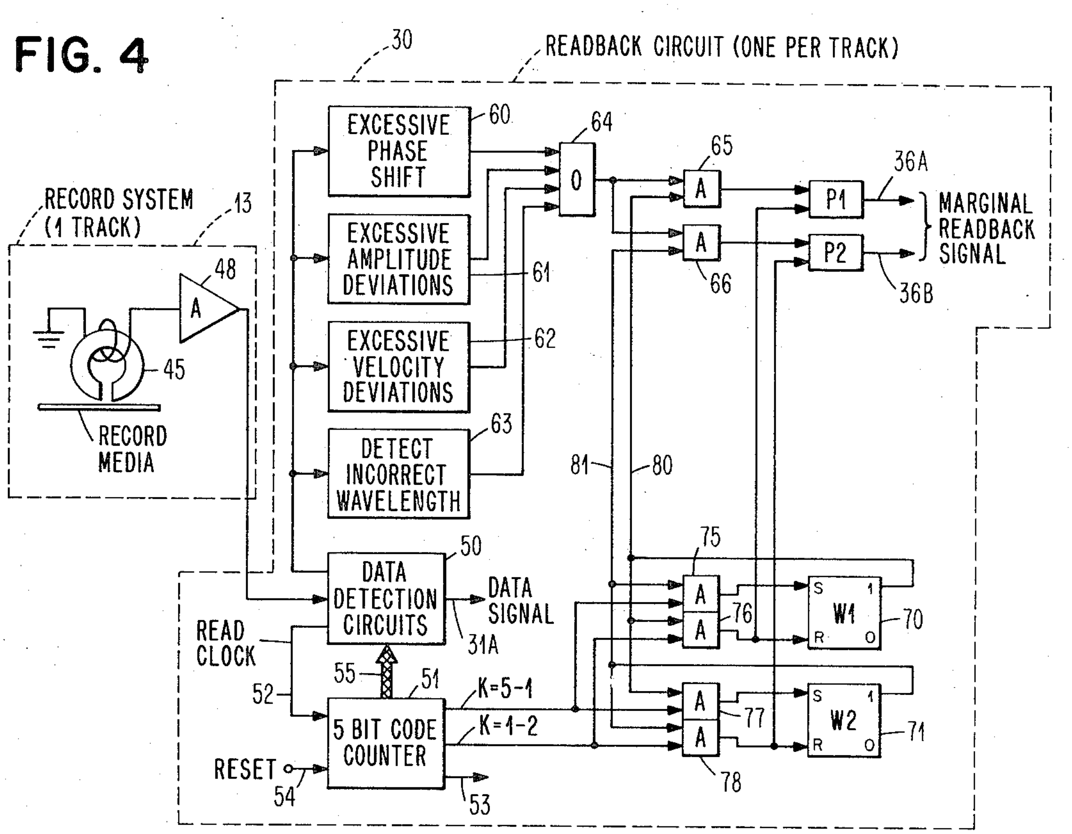
FIG. 4 is a simplified diagram of a readback circuit for one track of a record system illustrated in FIG. 3.
Figure 5:
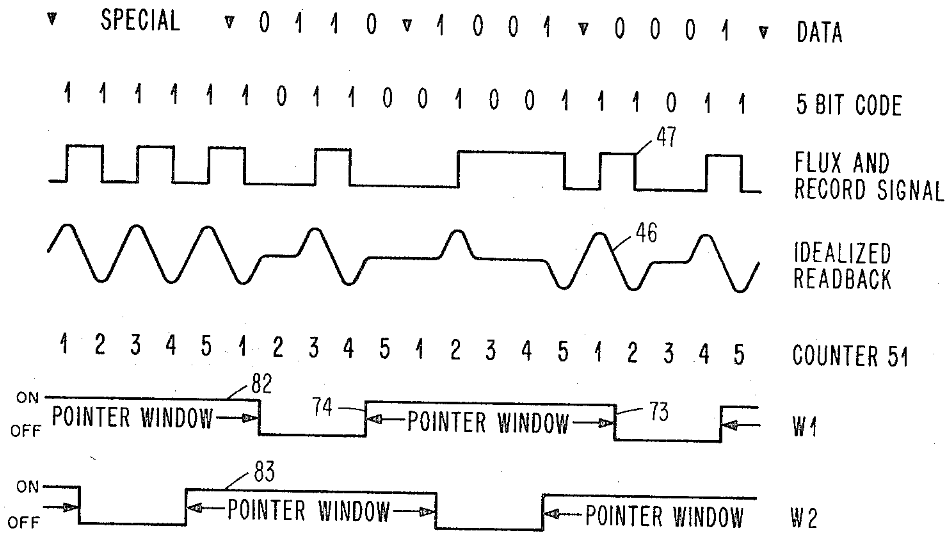
FIG. 5 is a set of signal waveforms and associated data bits used to illustrate operation of the FIG. 4 illustrated circuits.

Referring now to FIGS. 4 and 5, readback of signals from a single track is described. Record system 13 includes reading transducer 45 which generates readback signals 46 in accordance with recorded flux 47. Recorded flux 47 represents in NRZI form the five-bit code data. The four-bit data is shown immediately above the five-bit code groups. The carets show five-bit code group boundaries. Signal 46 is supplied through amplifier 48 to a plurality of detector circuits within readback circuits 30. First of all, data detection circuit 50 converts signal 46 into a signal pattern similar and preferably identical to signal 47. Because of phase shift and other changes in signal 46, the signal supplied by circuits 50 over line 31A may vary somewhat from signal 47.

Since data is recorded in five-bit code groups, counter 51 is used to tally the cells for each group irrespective of flux transitions therein. Data detection circuits 50 include a read clock which identifies the boundaries between adjacent cells. Such read clock signals are supplied over line 52 to increment counter 51. When counter 51 has reached a count of five, an indicating signal supplied over line 53 (part of cable 31, FIG. 3) synchronizes operation of deskewing apparatus 32 (FIG. 3). The signal on line 53 is a marker signal identifying the boundaries of the five-bit code groups such that each five-bit code group can be deskewed together and transmitted from apparatus 32 in a proper manner. Special character circuits 40 of FIG. 3 may provide a reset signal over line 54 to reset counter 51 to its reference state, thereby indicating the beginning of a five-bit code group. Counter 51 also supplies signals to data detection circuits 50 via cable 55 for synchronizing its operation.

Additionally, readback circuits 30 (FIG. 4) generate the marginal readback pointers based upon the windows shown in FIG. 2. Detection circuits 50 supply signals to circuits 60–63 based upon detection of data signals indicative of marginal readback. Marginal readback is indicated by excessive phase shift circuit 60, excessive amplitude deviation circuit 61, excessive velocity deviation circuit 62, and detect incorrect wavelength circuit 63. Each of these circuits supplies a binary signal to OR-circuit 64 for indicating whether or not the designed threshold of the respective monitored operation is exceeded. That is, in circuit 60 when the phase shift of signal 46 is excessive, then circuit 60 supplies a signal indicating such excessive phase shift. Base line shift may also be utilized in addition to phase shift. In a similar manner, circuit 63 measures one-half wavelengths between successive peaks of signal 46. When an exceedingly long wavelength is detected, a pointer signal is supplied to OR-circuit 64. The phenomena detected by circuits 60 and 63 may be of a transitory nature and, therefore, affect only one or a small number of sets of recorded signals. On the other hand, circuits 61 and 62 monitored phenomena usually affects a large number of groups of signals. For example, in a high-density recording system, the space required to record one set of code groups is very small. However, the time to change the velocity of the record media is quite long. Therefore, if there is an excessive velocity deviation, it affects the readback of an extremely large number of recorded signals. Similarly, in circuit 61, an excessive amplitude deviation, which is usually a loss of signal amplitude, is usually caused by separation of record media from the transducer. Such a separation usually occurs during rapid successive start/stop operations and will usually affect a large number of groups of recorded signals. Circuits 60 through 63 can be of known design, may be included as an integral portion of circuit 50 or may be independent of data detection. That is, circuits 60–63 could receive the readback signal from amplifier 48 and analyze same to obtain the above-stated results.

Examples of signal characteristics indicative of marginal readback on signal distortion include $\pm 60$ percent phase shift, 80 percent reduction in amplitude from a predetermined nominal readback amplitude, velocity variations of +20 percent and −30 percent and wavelengths exceeding three-bit positions on a media. Multiple thresholds may be provided with thresholds having larger deviations indicating a greater probability of error. That is, if there are three group pointers in a given set of signals, then two of the pointers may indicate a greater probability of error than the third. If the error correction capability is limited to two groups in error, then the two groups indicating a greater probability of error could be corrected and the third pointer ignored. The actual thresholds for marginal readback in any given data processing system is one of design choice, that is, usually a compromise decision is made between reliability and maximum data throughput. Cost/performance criteria are also important to selection of such thresholds. The physical characteristics of each system, i.e., the performance actually obtained, is important in selecting such thresholds. It is seen that the exemplary thresholds are not to be taken as a guide in selecting thresholds for any arbitrarily selected system, rather each designer must determine the thresholds (one or more) to maximize the advantages he can obtain by practicing the present invention.

The generation of the windows for sampling the pointer signal generated by circuits 60 through 63 is based upon the operation of counter 51. Since the windows overlap, two windows are generated simultaneously by the selective actuation of AND-circuits 65 and 66. To provide successive overlapping windows, actuation of these two AND-circuits is alternated by interconnected bistable latches 70 and 71, respectively labeled W1 and W2. The logic of the windows W1 and W2 is defined by the latch P1 and P2 setting and resetting signals W1*, W2* and $\overline{W1}$*, $\overline{W2}$*, respectively.

| | | |
|---|---|---|
| $W1^* = E \times W2$ | (start of W1) | (9) |
| $\overline{W1}^* = B \times W1$ | (end W1) | (10) |
| $W2^* = E \times W1$ | (start W2) | (11) |
| $\overline{W2}^* = B \times W2$ | (end W2) | (12) |

In the above equations, $B$ indicates the beginning and $E$ indicates the end of the code group which is being monitored by the window. $\overline{W1}$ and $\overline{W2}$ indicates the windows are closed. In the particular embodiment, since the window monitors the first bit of an upstream code group, $B$ is indicated when counter 51 changes from a 4 state to a 5 indicating state. This is shown at transition 74 in FIG. 5 in the W1 latch signal. In a similar manner, $E$ is indicated when counter 51 changes from a 1 to a 2 indicating state generating transition 73 in the W1 state signal. AND-circuits 75, 76, 77 and 78 perform the logic functions set forth in equations 9 through 12. Operation of latches 70, 71 is shown by signals W1 and W2. The W1 signal is supplied over line 80 for selectively actuating AND-circuit 65 while the W2 signal is supplied over line 81 for actuating AND-circuit 66. In the FIG. 5 illustration, the special character is monitored by the pointer window generated by the W1 signal as at 82. The code group representing data 0110 is monitored by the W2 window as at 83. Readback of the other code groups are similarly monitored by the successively alternated windows, i.e., opening of AND-circuits 65 and 66. Upon indication by any circuit 60 to 63 of a marginal operating condition during the respective windows, actuating signals are supplied to set bistable latches P1 and P2. These latches supply the error pointing signals, respectively, over lines 36A and 36B to be decommutated in error detection and correction circuits 35 in the same manner in which the windows were generated. Latches P1 and P2 are reset respectively by the output signals of AND-circuits 76 and 78 which respectively perform the logic set forth in equations 10 and 12. Of course, a small number, such as 2, group or set of signals could be combined to generate a pointer. It is preferred that each pointer be limited to one group of signals.

Error Detection and Correction

While the error detection and correction code is not a part of the present invention as such it is explained in a summary manner for facilitating an understanding of how the pointers cooperate therewith for enhancing error detection and correction.

Figure 7:
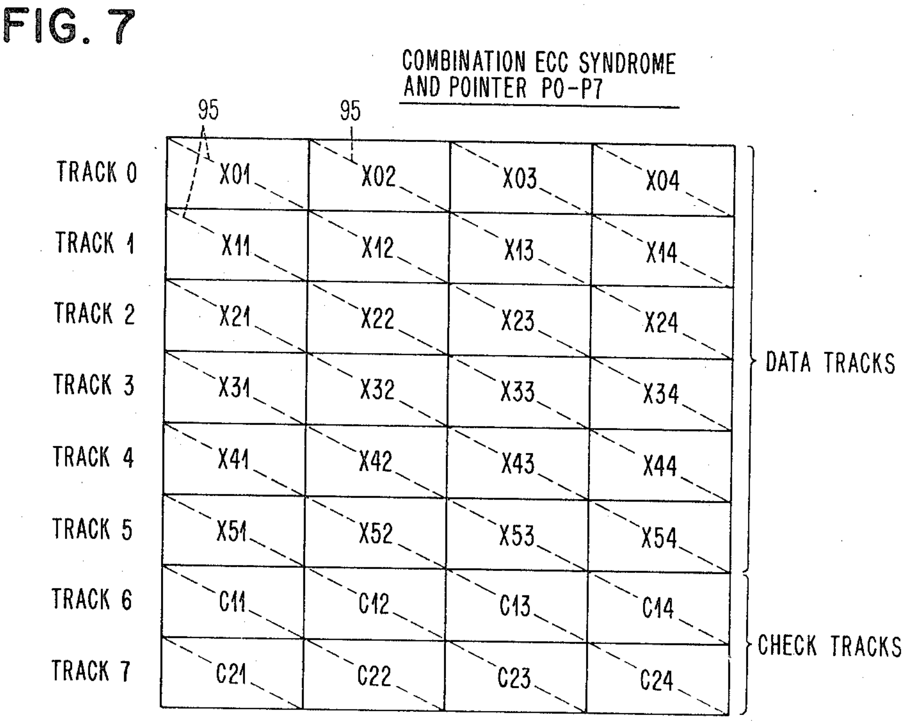
FIG. 7 illustrates the geometric relationships of data and check bits of one error-detecting code.

FIG. 6 shows the general arrangement of the error detection circuits 35. The data and check bits are received over cable 90 by syndrome 1 and syndrome 2 computers 91 and 92. These two computers are basically arrays of EXCLUSIVE OR circuits which compare the received signals representing binary 1's and 0's and combine them in a way to indicate location of errors in an array of data, as shown in FIG. 7. After computation of the syndromes, the syndromes, the data and the pointers are all combined in error corrector 93 for producing corrected data or detecting that the data cannot be corrected.

The combining of syndromes and the readback pointers is best understood by referring to FIG. 7 which is a chart showing the geometric relationship between the data tracks and check bit tracks. The boxes labeled "X" are the data track cells with the subscripts indicating the geometric location. The first subscript digit indicates the track, while the second subscript digit indicates the location of the cell crosswise of the media. Note that the byte is four bits long. Therefore, cell X01 is track 0, cell position 1. In a similar manner, the check bits C are geometrically identified. The track pointers P0 through P7 (respectively for tracks 0–7) point to a track possibly being in error. The calculated syndromes S1 and S2 from the error detection code, yet to be explained, points to an array of cells having an error. Such array is a diagonal of the cells going from upper left to lower right. For example, a syndrome byte depending upon its numeric value points to bit X04 as being in error; bits X03, X14 being in error; X02, X13, X24 being in error; X01, X12, X23, X34 being in error, and so forth as also indicated by the dashed lines 95 in FIG. 7. Note that check digits being in error are also detected and corrected by this system. To correct a bit in error, one of the track pointers P0 through P7 is combined with the syndromes to unambiguously identify the bit in error. For example, if cell X32 has an error, pointer P3 and syndrome for X21, X23, etc., are combined to point to that cell containing an error and correct same. If two syndromes indicate errors, then two bits in track three could be corrected. In the alternative, pointers P3 and P4 could be both active, with the two syndromes pointing to errors in bit positions X32 and X42.

The particular error detection and correction code about to be described without the pointers is capable of correcting one track in error. With the pointers, it can correct two tracks in error.

The flow chart for the FIG. 6 system is shown in FIG. 8. Upon receipt of the readback error pointers, a determination is made as to the number of pointers received. If there are three or more pointers received, the particular code as described in this specification is incapable of correcting that many errors. Therefore, the error correction can either be made based upon an assumed single error, or an invalid data tag may be forwarded to the utilization means (not shown) for further data manipulation in accordance with more exotic data retrieving programs. If in decision step 96, it is determined that the number of pointers N is not greater than 2, then syndrome bytes S1 and S2 are computed in step 97. In decision step 98 if there are no track pointers, then in step 99 the value of the syndrome bytes are interrogated. If both syndrome bytes equal 0, it is indicated in step 100 there are no errors in the data. However, if one or both of the syndrome bytes indicate an error, i.e., a nonzero, it is assumed that there is a single error and error correction is performed on a pure error detection and correction code technique, which is beyond the scope of the present teaching.

On the other hand, if there are one or two pointers activated, then error corrections are performed in step 101, using the logic set forth and explained with respect to FIG. 7.

Figure 9:
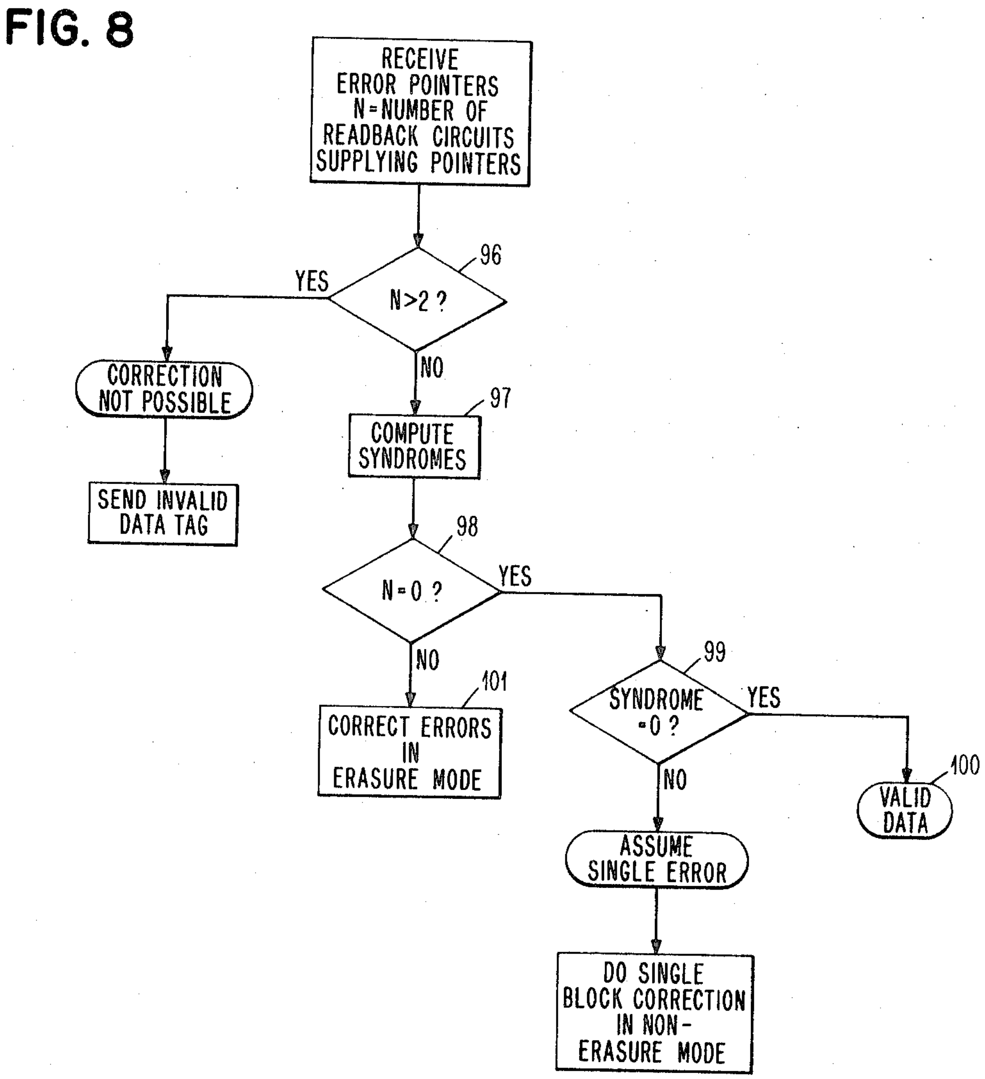
FIG. 9 is a table showing numerical relatives between data and check bit positions for one error-detecting code.

Generation of the two four-bit check bytes is explained with respect to FIG. 9. The data to be checked is represented in the table as X01 through X54. Check digits C11 through C24 are the residue of the EXCLUSIVE OR function of all binary 1's contained in the corresponding row in the data portion of the table. For example, check digit C11 is the Exclusive OR or modulo 2 added result of all data bits X01, X11, X21, X31, X41 and X51. In a similar manner, the other check digits are calculated. During readback, the data signals detected in cells X01 through X54 are used to calculate check digits C11 through C24, in the same manner as when the check digits were originally calculated. The logic for this is readily designed by one skilled in the art and is not set forth in detail. After the calculation of the check digits based upon the received data, such calculated check digits are compared with the received or readback check digits, as is normally done in residue checking systems.

With eight check digits, there are eight syndromes calculated according to the equation:

$$Sij = Cij + Cij^* \qquad (13)$$

In the above equation, the syndrome digit *S* for location *ij* is the EXCLUSIVE OR result or modulo 2 sum of the received check digit *Cij* and the calculated check digit *Cij* *. There are eight calculated syndrome bits:

| | | | | | |
|---|---|---|---|---|---|
| S11 | S12 | S13 | S14 | Syndrome Byte 1 | |
| S21 | S22 | S23 | S24 | Syndrome Byte 2 | (14) |

It may be noted that the check digits C11 through C14 are the EXCLUSIVE OR sum of the vertical columns of FIG. 7. Check digits C21 through C24 are the EXCLUSIVE OR sum of three of the diagonals represented by dashed lines 95. The two syndromes define errors that cross. One error can be corrected as being the unique digit, that is, if the C11 bit indicates an error, it is in the first or left-hand column of FIG. 7. If the C21 bit generates syndrome S21, then the error is in one of the bit positions X01, X12, X23, X34 or X31, X42, X53 or X41, X52. Of course, additional syndromes appear to pinpoint the single bit in error. With the pointers described above, and the syndromes combined, two errors can be pinpointed. For example, if data bit X31 is in error, then the check digits and hence the syndromes C11, C21, and C22 will be different thereby uniquely defining that single bit in error. From inspection of FIG. 9, further syndromes can be defined. Now then, if there are two errors, for example, bits X31 and X32 which reside on the same track, pointer P3 will be active and the syndrome bits S11, S12, S21 and S22 are active. By limiting the errors to track three, both errors are corrected. Implementation of the described code is in accordance with known error correction and detection logic design techniques. Of course, any code that takes advantage of pointers may be arbitrarily substituted for the described code.

While the invention has been particularly shown and described with reference to preferred embodiments thereof, it will be understood by those skilled in the art that various changes in form and details may be made therein without departing from the spirit and scope of the invention.

What is claimed is:

1. The method of enhancing error correction in a signal-processing system, the following steps in combination, establishing groups of data signals and associated check bit signals in successive sets of such signals, each group of signals being in a different processing channel, measuring the quality of signal processing in each channel on a set by set basis and supplying signals indicative of such quality, further establishing quality signal indications in each channel for data or check bit signals occurring adjacent said sets, respectively, and, generating syndrome signals from said data and check bit signals indicative of occurrence of any signal error in a given set of signals, and combining said quality signals with said syndrome signals to unambigously identify a signal in error within the respective sets and then correct such signal.

2. The method of claim 1, wherein said signal processing includes recording said signals on a record media, said data signals being recorded in an array including a plurality of immediately adjacent record tracks receiving said check bit signals, said check bits having a geometric relation to said data in each set, and additionally measuring the signal-processing quality in each channel on both sides of each group of signals and using such additional measuring with measuring within each group to generate said quality-indicating signals.

3. The method of claim 2, wherein said data and check bit signals are coded in run-length-limited code groups for recording on said media, and during readback of signals from said media reconverting said code groups independently into groups of data and check bit signals and monitoring the run-length characteristics for providing a quality-indicating signal indicative of validity of each readback code group and then merging said quality signals into a single signal for each group of signals.

4. The method of claim 3, wherein for each group of signals in the respective channels the phase shift and amplitude thereof are monitored and possible error pointers being generated upon detection of excessive phase shift or amplitude variations.

5. The method of operating a digital recording system, comprising the steps of recording data signals in a plurality of parallel tracks on a record media having motion relative with respect to a transducer, recording successive sets of check bit and data signal groups on said media in tracks and logically associating said check bit signals with said data signals within each said set, then sensing said recorded signals in serial along said tracks for producing readback signals from the respective tracks, while sensing said recorded signals evaluating the quality of said readback signals of each track for each group of signals, including sensing signal quality in at least a first portion of the next succeeding group of signals in each track and generating a quality-indicating signal for such group, each group of readback signals having such independent quality evaluation, and upon an indication of error by comparing said check bit signals with said data signals in each group of data signals using quality indications to point to possible errors in each said set.

6. The method set forth in claim 5 further including the step of adding evaluation of selected signals preceding each group and generating a quality signal for each group including said selected signals, group signals, and signals in said first portion.

7. The method set forth in claim 5 further including the steps of establishing said check signal and data signals in a geometric array on said media with said array establishing the size of each said set of signals such that each error correction array has independently generated quality signals.

8. The method set forth in claim 5 further including the steps of independently deriving a plurality of different quality signals for each group of said signals, ones of said quality signals including sensing signal quality in said first portion, and generating others of said quality signals by evaluation of characteristics within each said group.

9. The method of claim 5 further including the steps of generating a plurality of quality signals for each group of signals based upon diverse quality criteria and logically combining same to generate said quality signals in accordance with said diverse criteria and such logic combination.

10. A readback system for a digital recorder, means to reproduce signals from a plurality of record tracks on a record media and supply readback signals, means grouping said readback signals from the respective tracks into groups of a small number of signals greater than one, sets of such groups being substantially simultaneously read from plural tracks, means independently evaluating quality of said readback signals in each group for supplying possible error pointers for each set of readback signals, combining means detecting possible errors in each group at said readback signals and ignoring said pointers when no errors are detected and combining said pointers with detection of possible errors to point to actual errors in the respective sets.

11. The system of claim 10, wherein said record media contains said data as run-length-limited code groups, conversion means including said grouping means converting said code groups to groups of check bit and data readback signals, RLC means evaluating said code groups and supplying a pointer signal to said combining means for each group of signals derived from a code group violating said run-length limit.

12. The system of claim 10, wherein each said independent evaluation means includes means for monitoring for excessive phase shift, means for monitoring for excessive amplitude variations, means for monitoring for excessive record media velocity variations and means for monitoring for excessive readback signal wavelength variations.

13. The system of claim 10, wherein said independent evaluation means for each channel includes window generation means for receiving said respective readback signals for a period of time greater than the period of time required to receive one group of signals such that each independent error pointer for each group of readback signals represents possible error conditions not only within such group of readback signals but, additionally, error conditions in readback signals immediately adjacent thereto.

14. The system set forth in claim 13 wherein said window generation means is responsive to said grouping means to include a first portion from a downstream group for each group of signals.

15. The system of claim 13, wherein said window generation means is responsive to said grouping means to include a predetermined number of bit positions from upstream and downstream groups of signals within a given window for a given group of signals.

16. The system of claim 15, wherein each said independent evaluation means is independently responsive to predetermined distortions of said readback signal within the respective windows to generate error pointers and further independently responsive to data errors to generate additional error pointers, and said combining means being responsive to all said pointers in a like manner for combining same, with said syndrome signals.

* * * * *